United States Patent
Rose

(10) Patent No.: US 9,321,116 B2
(45) Date of Patent: Apr. 26, 2016

(54) COLD METAL TRANSFER GAS METAL ARC WELDING APPARATUS AND METHOD OF OPERATION

(75) Inventor: William M. Rose, Warren, MA (US)

(73) Assignee: United Technologies Corporation, Hartford, CT (US)

( * ) Notice: Subject to any disclaimer, the term of this patent is extended or adjusted under 35 U.S.C. 154(b) by 2183 days.

(21) Appl. No.: 12/398,748

(22) Filed: Mar. 5, 2009

(65) Prior Publication Data

US 2010/0224609 A1  Sep. 9, 2010

(51) Int. Cl.
| | |
|---|---|
| *B23K 9/00* | (2006.01) |
| *B21D 53/84* | (2006.01) |
| *B65H 20/00* | (2006.01) |
| *B23K 9/022* | (2006.01) |
| *B23K 9/173* | (2006.01) |
| *B23K 9/23* | (2006.01) |
| *B23K 9/28* | (2006.01) |
| *B23P 6/00* | (2006.01) |
| *F01D 5/00* | (2006.01) |

(52) U.S. Cl.
CPC .............. *B23K 9/022* (2013.01); *B23K 9/173* (2013.01); *B23K 9/23* (2013.01); *B23K 9/28* (2013.01); *B23P 6/007* (2013.01); *F01D 5/005* (2013.01); *B23K 2201/001* (2013.01); *F05D 2230/80* (2013.01); *F05D 2260/80* (2013.01)

(58) Field of Classification Search
CPC .. B23K 2201/001; B23K 9/022; B23K 9/173; B23K 9/23; B23K 9/28; B23P 6/007; F01D 5/005; F05D 2230/80; F05D 2260/80
USPC ..... 219/137 R, 136, 137 PS, 137 WM, 137.2, 219/137.31, 137.44, 137.62, 137.42, 137.7, 219/137.9, 139, 146.23, 146.32, 146.41, 219/146.52, 162; 29/888.3, 527.2, 424, 29/888.07, 888.074; 226/181, 182, 185, 226/190, 177
See application file for complete search history.

(56) References Cited

U.S. PATENT DOCUMENTS

| | | | |
|---|---|---|---|
| 3,056,018 A |  | 9/1962 | Peterson |
| 4,177,373 A | * | 12/1979 | Roen ........................ 219/125.12 |
| 4,726,104 A |  | 2/1988 | Foster et al. |
| 4,937,428 A |  | 6/1990 | Yoshinaka et al. |
| 5,101,093 A | * | 3/1992 | Matsui et al. ............ 219/137.61 |
| 5,686,001 A |  | 11/1997 | Wrabel et al. |

(Continued)

FOREIGN PATENT DOCUMENTS

| | | |
|---|---|---|
| DE | 19507472 A1 | 9/1996 |
| DE | 202007003720 U1 | 5/2007 |

(Continued)

OTHER PUBLICATIONS

Official Extended Search Report and Written Opinion of the European Patent Office in counterpart foreign Application No. 10250010, filed Jan. 5, 2010.

*Primary Examiner* — Dana Ross
*Assistant Examiner* — Ket D Dang
(74) *Attorney, Agent, or Firm* — Kinney & Lange, P.A.

(57) ABSTRACT

A cold metal transfer (CMT) contact tip has a substantially copper-free contact surface defining a wire passage. The CMT contact tip is used with a CMT welding apparatus having a weld wire and a wire feeder for feeding and oscillating the weld wire forward and backward through the wire passage where the weld wire shares a concentric axis with the wire passage.

20 Claims, 2 Drawing Sheets

(56) References Cited

U.S. PATENT DOCUMENTS

| | | | |
|---|---|---|---|
| 5,806,751 A | 9/1998 | Schaefer et al. | |
| 5,911,894 A | 6/1999 | Colling | |
| 6,093,907 A | 7/2000 | Hidaka | |
| 6,127,651 A * | 10/2000 | Burgoon et al. | 219/137 R |
| 6,742,698 B2 | 6/2004 | Shah et al. | |
| 7,165,965 B2 * | 1/2007 | Olaru | 425/549 |
| 2006/0151453 A1 * | 7/2006 | Gordon et al. | 219/137.61 |
| 2006/0225842 A1 * | 10/2006 | Darcy et al. | 156/580.1 |
| 2006/0237411 A1 * | 10/2006 | Mendez et al. | 219/137 R |
| 2007/0039936 A1 * | 2/2007 | Lee et al. | 219/145.1 |
| 2007/0056944 A1 | 3/2007 | Artelsmair | |
| 2007/0221631 A1 | 9/2007 | Ruokolainen et al. | |
| 2009/0001065 A1 * | 1/2009 | Ladru et al. | 219/137 R |
| 2009/0107971 A1 * | 4/2009 | Ruhrnossl et al. | 219/137.31 |

FOREIGN PATENT DOCUMENTS

| | | | | |
|---|---|---|---|---|
| EP | 545792 A1 * | 6/1993 | | B23K 9/04 |
| EP | 1721696 A1 | 4/2006 | | |
| GB | 2239204 A | 6/1991 | | |
| JP | 57185999 A * | 11/1982 | | C25D 7/00 |
| WO | WO2006125234 A1 | 11/2006 | | |
| WO | WO 2007112461 A1 * | 10/2007 | | |

* cited by examiner

COLD METAL TRANSFER GAS METAL ARC WELDING APPARATUS AND METHOD OF OPERATION

BACKGROUND

The present invention relates to an arc welding apparatus, and in particular, to a cold metal transfer (CMT) welding apparatus and method of operation.

Gas metal arc welding (GMAW), commonly referred to as metal inert gas (MIG) welding or metal active gas (MAG) welding, is a welding process in which a consumable weld wire and a shielding gas are fed through a welding torch. There are many types of GMAW that can be used in various situations. Typically, the weld wire is fed though a contact tip made of copper or a copper alloy in the welding torch. The contact tip guides the weld wire and also provides a continuing electrical connection from a power supply to the weld wire as the weld wire is fed. The weld wire is held near or in contact with a metal welding surface such that electricity can arc between the weld wire and the surface. The arc causes a tip of the weld wire to liquefy and is subsequently applied to the welding surface. Typically, an inert or semi-inert gas is blown over the weld wire to limit contaminants near the weld. While GMAW is a useful welding technique, it can heat the welding surface to temperatures that cause undesirable material changes, such as hardening and warpage.

GMAW cold metal transfer (CMT) is a welding technique that reduces heat created on the welding surface. CMT is based on a deliberate and systematic activation and deactivation of the heating arc so as to systematically heat and cool the weld wire while bringing the wire into and out of contact with the weld pool at a rapid frequency. This is performed by axially oscillating the weld wire forward and backward through the copper contact tip with a frequency of up to 70 times per second. Unfortunately, the grinding contact between the weld wire and the contact tip can wear away the contact tip, especially if the weld wire is a harder material than the contact tip. This wearing away can cause material worn from the contact tip to be deposited on the weld wire or blown into the weld.

SUMMARY

According to the present invention, a cold metal transfer (CMT) contact tip has a substantially copper-free contact surface defining a wire passage. The CMT contact tip is used with a CMT welding apparatus having a weld wire and a wire feeder for feeding and oscillating the weld wire forward and backward through the wire passage where the weld wire shares a concentric axis with the wire passage.

In another embodiment, a CMT welding apparatus includes a CMT contact tip, a weld wire, and a CMT wire feeder. The CMT contact tip has a contact surface that is a substantially copper-free metal. The weld wire is in physical contact with the contact surface. The CMT wire feeder is constructed and arranged to feed the weld wire through the CMT contact tip with an axially oscillating motion with respect to a centerline axis of the CMT contact tip.

Another embodiment includes a method for welding a workpiece. The method includes the steps of installing a CMT contact tip having a substantially copper-free metal contact surface into a CMT welding device, feeding a weld wire through the CMT contact tip such that the weld wire axially oscillates along a centerline axis of the CMT contact tip and in contact with the contact surface, and depositing material from the weld wire on the workpiece to form a substantially copper-free weld.

DETAILED DESCRIPTION

Figure 1:
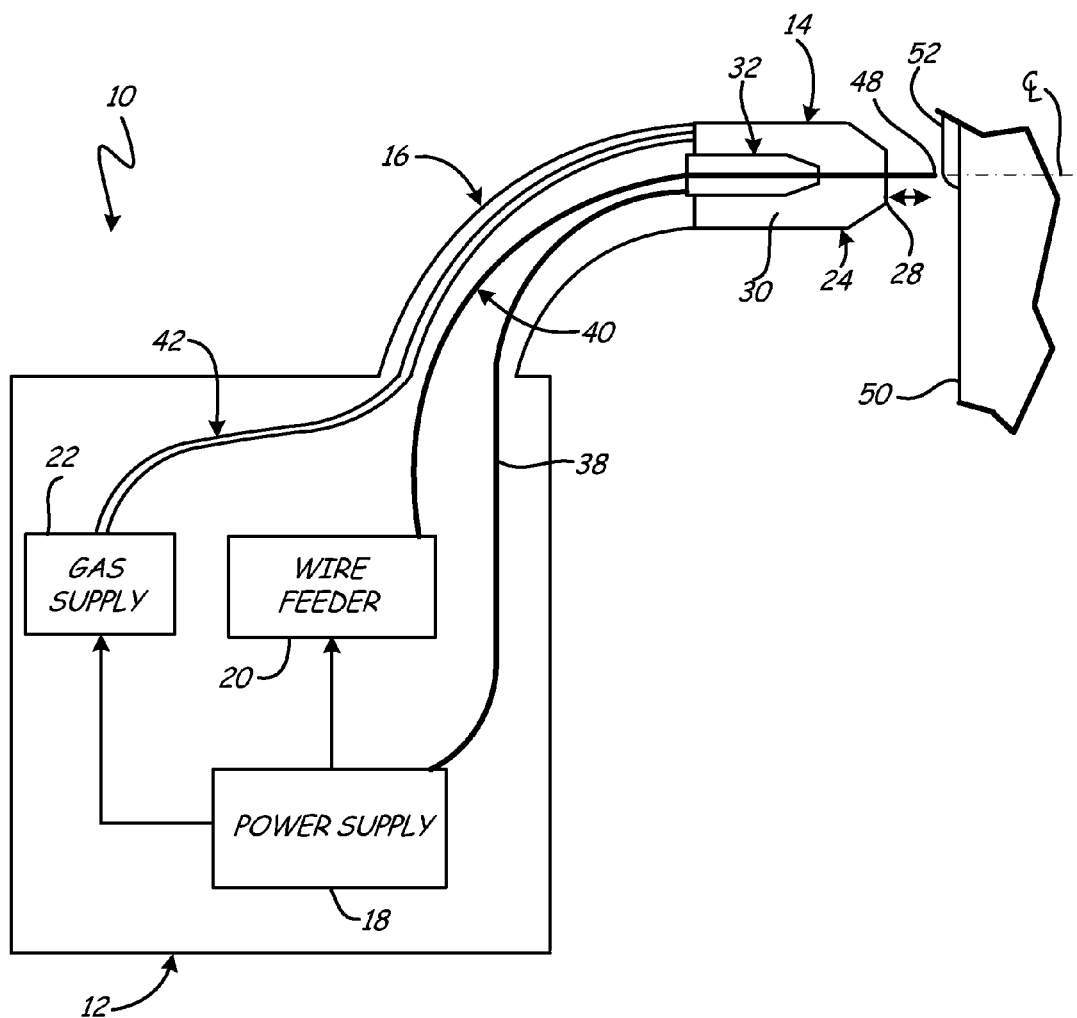
FIG. 1 is a schematic elevation view of a cold metal transfer welding apparatus embodying the present invention.

Referring to FIG's 1 and 2, cold metal transfer (CMT) welding apparatus 10 of the present invention is useful for welding workpiece 50 that may be made of a cobalt alloy or nickel alloy. Welding apparatus 10 includes weld wire 40 that may be made of a cobalt alloy, and contact tip 32 having a substantially copper-free contact surface 74, such as an aluminum surface. When weld wire 40 grinds against contact surface 74, small particles of aluminum can break off instead of small particles of weld-contaminating copper.

Supply housing 12 of welding apparatus 10 generally supports and surrounds electric power supply 18, wire feeder 20 and gas supply 22. A preferably flexible conduit 16 of apparatus 10 is supported by and axially projects outward from supply housing 12 to a distal end that connects to torch 14 of apparatus 10. Conduit 16 generally surrounds and protects power cable 38 connected electrically to power supply 18, weld wire 40 fed from wire feeder 20, and gas hose 42 communicating with gas supply 22. Both gas supply 22 and wire feeder 20 may be powered via power supply 18.

Torch 14 has gas nozzle 24 that has and extends axially along centerline axis CL between opposite ends with the first end connected structurally to the distal end of conduit 16 and the opposite second end carrying nozzle output face 28. Contact tip 32 of torch 14 is disposed in cavity 30 defined by and radially inward from nozzle 24. Contact tip 32 as well as weld wire 40 are also oriented with centerline axis $C_L$.

Power cable 38 electrically connects power supply 18 to contact tip 32. Power supply 18 provides electrical power to contact tip 32 for welding. Power supply 18 also provides power to, and controls operation of, wire feeder 20 and gas supply 22. Wire feeder 20 feeds weld wire 40 from a spool (not shown) through conduit 16 and through contact tip 32 such that weld wire tip 48 extends past nozzle output face 28. Weld wire 40 is in contact with contact tip 32 such that electrical power transmitted to contact tip 32 is subsequently transmitted to weld wire 40. Weld wire 40 can be made of cobalt or cobalt alloys. Gas supply 22 is connected to gas nozzle 24 via gas hose 42. Gas supplied from gas supply 22 flows into nozzle cavity 30 and out nozzle output face 28. Gas supply 22 can supply inert and semi-inert gasses such as argon, helium, carbon dioxide, or mixtures thereof. The gas used can be selected so as to adequately shield weld wire 40 from undesirable contaminants during welding.

In operation, power supply 18 signals wire feeder 20 to feed weld wire 40 toward workpiece 50. Power supply 18 also signals gas supply 22 to supply gas to and out of gas nozzle 24. Power supply 18 further supplies electrical power to contact tip 32, which transmits that power to weld wire 40. When weld wire tip 48 becomes sufficiently close to, or in contact with, workpiece 50, electricity can flow from weld wire 40 to workpiece 50. Workpiece 50 may be a high strength metal such as cobalt, cobalt alloys, or nickel alloys. In one embodiment, workpiece 50 can be a damaged turbine blade for a gas turbine engine. When power supply 18 senses a short circuit, it signals wire feeder 20 to retract weld wire 40. After a brief retraction, power supply 18 signals wire feeder 20 to feed weld wire 40 toward workpiece 50 again. This repeats such that weld wire 40 is effectively oscillating axially with respect to contact tip 32. With each oscillation, electricity arcs from weld wire tip 48 to workpiece 50 and causes a portion of weld wire 40 (also called weld filler) to melt and become deposited as weld metal 52 (also called weld pool) on workpiece 50. As oscillating frequency increases, heat imparted to workpiece 50 decreases. In one embodiment, oscillations may occur about 70 times per second. In other embodiments, oscillating frequency can be less than about 70 times per second so long as heat imparted to workpiece 50 does not exceed an acceptable threshold. During these oscillations, weld wire 40 maintains electrical, and physical, contact with contact tip 32.

Figure 2:
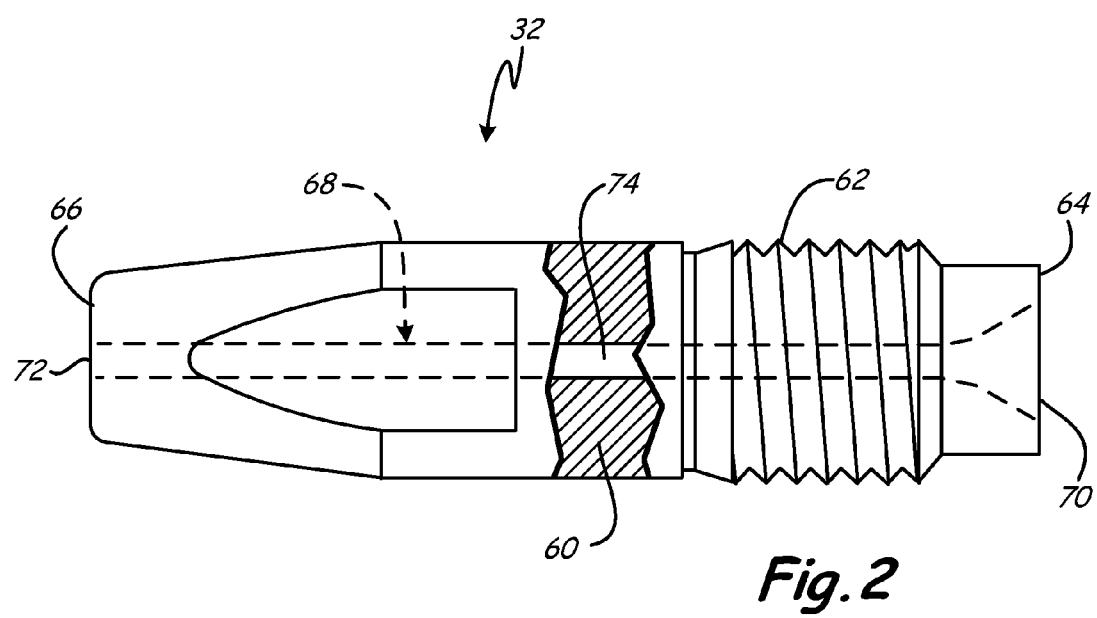
FIG. 2 is a side partial cut-away view of a contact tip of in the welding apparatus of FIG. 1.

FIG. 2 is a side partial cut-away view of contact tip 32. Contact tip 32 includes electrically conductive metal body 60, connection portion 62, proximal end 64, tip or distal end 66, passage 68, passage inlet 70, passage outlet 72, and contact surface 74. Shape of contact tip 32 is defined by a substantially solid metal body 60. Metal body 60 may be a substantially copper-free metal such as aluminum, aluminum alloys, titanium, titanium alloys, nickel, nickel alloys, cobalt, cobalt alloys, and stainless steel. Contact tip 32 extends from proximal end 64 to tip or distal end 66. Connection portion 62 is configured to connect to a welding torch of a CMT welding apparatus such as torch 14 as illustrated in FIG. 1. In the illustrated embodiment, connection portion 62 carries a threaded surface for threading into torch 14 (shown in FIG. 1).

Passage 68 is disposed concentrically to and extending along an axial length of contact tip 32 from passage inlet 70 (at proximal end 64) to passage outlet 72 (at distal end 66). In the illustrated embodiment, passage inlet 70 has a substantially frusto-conical shape for facilitating insertion of weld wire 40 (shown in FIG. 1). The remainder of passage 68 has a substantially cylindrical shape and is defined by contact surface 74 carried by body 60. Contact surface 74 may comprise a substantially copper-free metal such as aluminum, aluminum alloys, titanium, titanium alloys, nickel, nickel alloys, cobalt, cobalt alloys, and stainless steel. In one embodiment, contact surface 74 may be an aluminum alloy with a relatively high conductivity. In the illustrated embodiment, contact tip 32 is a single-homogeneous piece made of a substantially uniform metal. Consequently, the metal used for connection portion 62 is preferably the same metal as that used for contact surface 74 and is a single, continuous piece there between. Using a single continuous piece, as opposed to multiple pieces, may reduce electrical resistance of contact tip 32. In an alternative embodiment, a portion of contact tip 32 may be made of virtually any suitable material so long as contact surface 74 is a substantially copper-free metal. The substantially copper-free metal has a sufficiently small quantity of copper (or zero copper) such that performance of weld metal 52 will not be measurably altered due to copper contamination. The substantially copper-free metal can contain essentially no copper.

As weld wire 40 (shown in FIG. 1) is fed through, and oscillates axially in, passage 68, weld wire 40 can rub or grind against contact surface 74. This grinding can wear away contact surface 74, causing particles from contact surface 74 to become deposited in weld metal 52 (shown in FIG. 1). In certain circumstances, it may be undesirable for certain metals to contaminate weld metal 52. For example, certain portions of gas turbine engines, such as turbine blades, can be made from high-strength, heat-tolerant materials such as cobalt, cobalt alloys, and nickel alloys. Using a weld wire of cobalt or cobalt alloys to repair the turbine blade can create a relatively strong, creep-resistant weld. However, if weld metal 52 is contaminated with copper, weld metal 52 can have a greater susceptibility to creep. This can be especially problematic when using CMT welding apparatus 10 with a cobalt weld wire 40 and a copper contact surface 74. The relatively fast oscillation of the relatively hard cobalt weld wire 40 can grind a relatively large quantity of copper off contact surface 74. By using contact tip 32 configured for use with CMT welding apparatus 10 and made from a substantially copper-free metal, such as aluminum, the amount of copper in weld metal 52 can be reduced or eliminated. Many alloys, including cobalt alloys, already have aluminum in the alloy. Such alloys can tolerate trace additions of aluminum. In some applications, contamination of weld metal 52 can weaken weld metal 52 in ways other than creep. For example, contaminating a relatively ductile alloy with an incompatible metal can make the ductile alloy more brittle.

Selection of the substantially copper-free metal can depend on the application and on design preferences. In one embodiment, where weld wire 40 comprises cobalt or a cobalt alloy and contact surface 74 is desired to have a relatively low electrical resistance, contact surface 74 may comprise aluminum or an aluminum alloy. In another embodiment, where weld wire 40 is cobalt or a cobalt alloy and contact surface 74 is desired to be relatively wear-resistant, contact surface 74 can be cobalt, a cobalt alloy, or stainless steel. In another embodiment, where weld wire 40 is nickel or a nickel alloy and contact surface 74 is desired to be relatively wear-resistant, contact surface 74 can be nickel, a nickel alloy, or stainless steel. In yet another embodiment, where weld wire 40 is titanium or a titanium alloy, contact surface 74 can be titanium or a titanium alloy. Weld wire 40 of a particular titanium alloy can be paired with contact tip 32 of substantially the same titanium alloy. In still other embodiments, contact surface 74 can be other non-copper metals to suit the needs of particular applications.

It will be recognized that the present invention provides numerous benefits and advantages. For example, the invention allows for welding using CMT technology while limiting copper contamination in weld metal 52. This can allow use of CMT in various applications that would not otherwise be practical. This can be particularly useful in assembly and repair of gas turbine engines when utilizing a cobalt or cobalt alloy weld wire 40 in a repair welding process. Using a substantially copper-free contact surface 74 allows one to create welds with a reduced propensity to creep. Using CMT allows for welding with less warpage in workpiece 50 due to welding heat.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims. For example, use of welding apparatus 10 is not limited to assembly and repair of gas turbine engines, rather, can be used in virtually any suitable welding project that can benefit from its use. Additionally, shape of contact tip 32 need not be limited to that illustrated in FIG. 2 so long as the shape is suitable for use in a cold metal transfer welding apparatus.

The invention claimed is:

1. A cold metal transfer (CMT) welding apparatus, comprising:
    a CMT contact tip having a contact surface that is a substantially copper-free metal that contains essentially no copper;
    a weld wire in physical contact with the contact surface; and
    a CMT wire feeder constructed and arranged to feed the weld wire through the CMT contact tip with an axially oscillating motion with respect to a centerline axis of the CMT contact tip.

2. The CMT welding apparatus of claim 1, wherein the weld wire is cobalt or a cobalt alloy.

3. The CMT welding apparatus of claim 1, wherein the weld wire is substantially the same copper-free metal as that selected for the contact surface.

4. The CMT welding apparatus of claim 1, wherein the contact surface is aluminum or an aluminum alloy.

5. The CMT welding apparatus of claim 1, wherein the contact surface is stainless steel.

6. The CMT welding apparatus of claim 1, wherein the contact surface is titanium or a titanium alloy.

7. The CMT welding apparatus of claim 1, wherein the contact surface is cobalt or a cobalt alloy.

8. A cold metal transfer (CMT) contact tip for use with a CMT welding apparatus, the CMT welding apparatus having a wire feeder for feeding and oscillating a weld wire forward and backward through and sharing a concentric axis with a wire passage in the CMT contact tip, the CMT contact tip comprising:
    a substantially copper-free contact surface defining the wire passage, wherein the substantially copper-free contact surface contains essentially no copper.

9. The CMT contact tip of claim 8, wherein the CMT contact tip is a homogeneous, single-piece, metal body.

10. The CMT contact tip of claim 8, comprising the contact surface being stainless steel.

11. The CMT contact tip of claim 8, comprising the contact surface being aluminum or an aluminum alloy.

12. The CMT contact tip of claim 8, comprising the contact surface being titanium or a titanium alloy.

13. The CMT contact tip of claim 8, comprising the contact surface being nickel or a nickel alloy.

14. The CMT contact tip of claim 8, comprising the contact surface being cobalt or a cobalt alloy.

15. A method for welding a workpiece, the method comprising the steps of:
    installing a cold metal transfer (CMT) contact tip having a substantially copper-free metal contact surface into a CMT welding device;
    feeding a weld wire through the CMT contact tip such that the weld wire axially oscillates along a centerline axis of the CMT contact tip and in contact with the contact surface; and
    depositing material from the weld wire on the workpiece to form a substantially copper-free weld, wherein the substantially copper-free metal contact surface has a sufficiently small quantity of copper (or zero copper) such that performance of the substantially copper-free weld will not be measurably altered due to copper contamination.

16. The method of claim 15, wherein the weld wire is a metal selected from the group consisting of cobalt and cobalt alloys.

17. The method of claim 15, wherein the workpiece is a damaged turbine blade for a gas turbine engine.

18. The method of claim 15, wherein the workpiece is cobalt, a cobalt alloy, or a nickel alloy.

19. The method of claim 15, wherein the weld wire oscillates with respect to the CMT contact tip without the CMT contact tip depositing copper on the weld wire.

20. The method of claim 19, wherein the weld wire oscillates axially with respect to the CMT contact tip about 70 times per second during feeding.

* * * * *